June 11, 1929.  J. KARMAZIN  1,717,039
RADIATOR ASSEMBLING MACHINE
Filed June 2, 1926   2 Sheets-Sheet 1
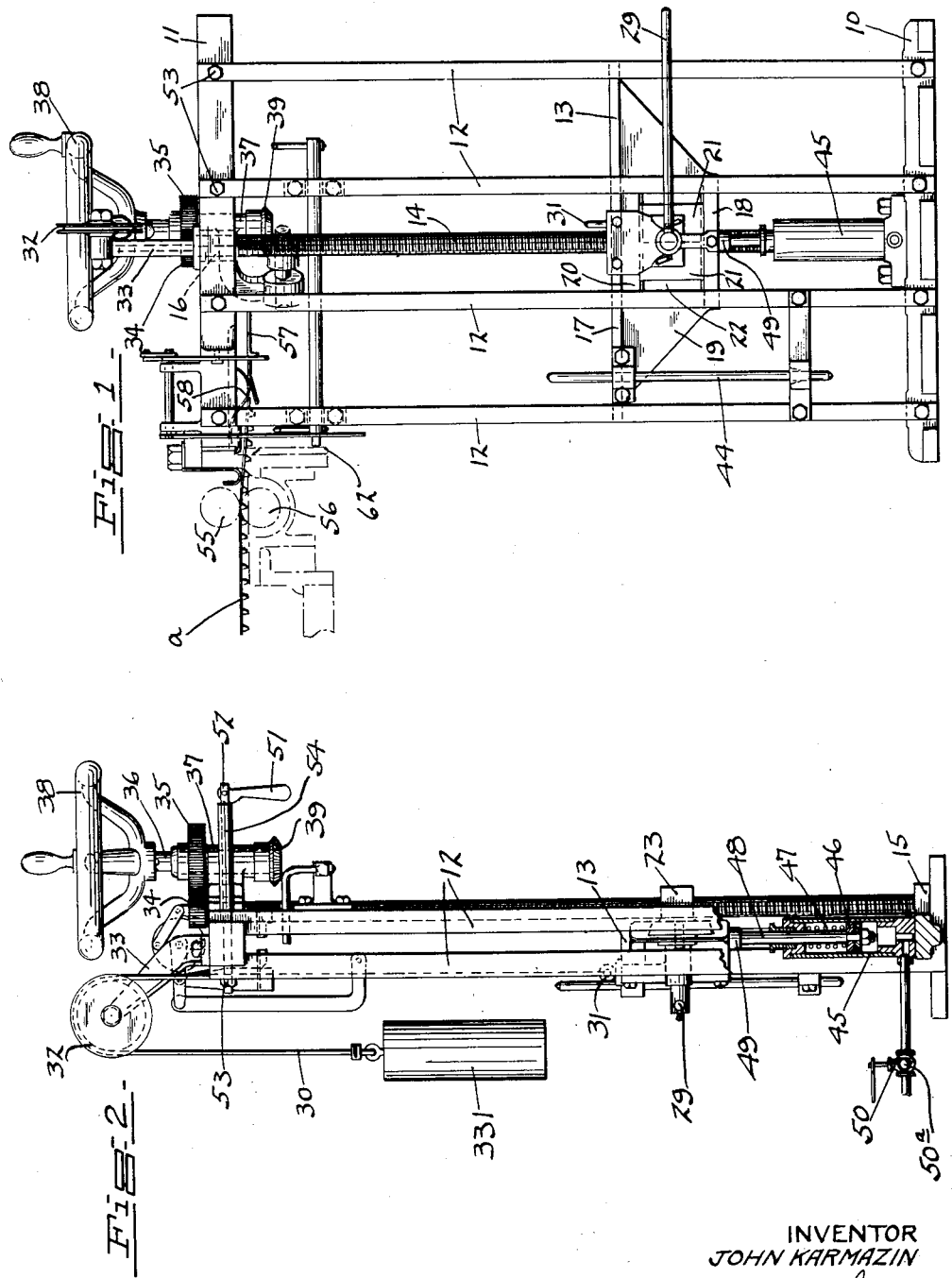
INVENTOR
JOHN KARMAZIN
BY
ATTORNEYS.

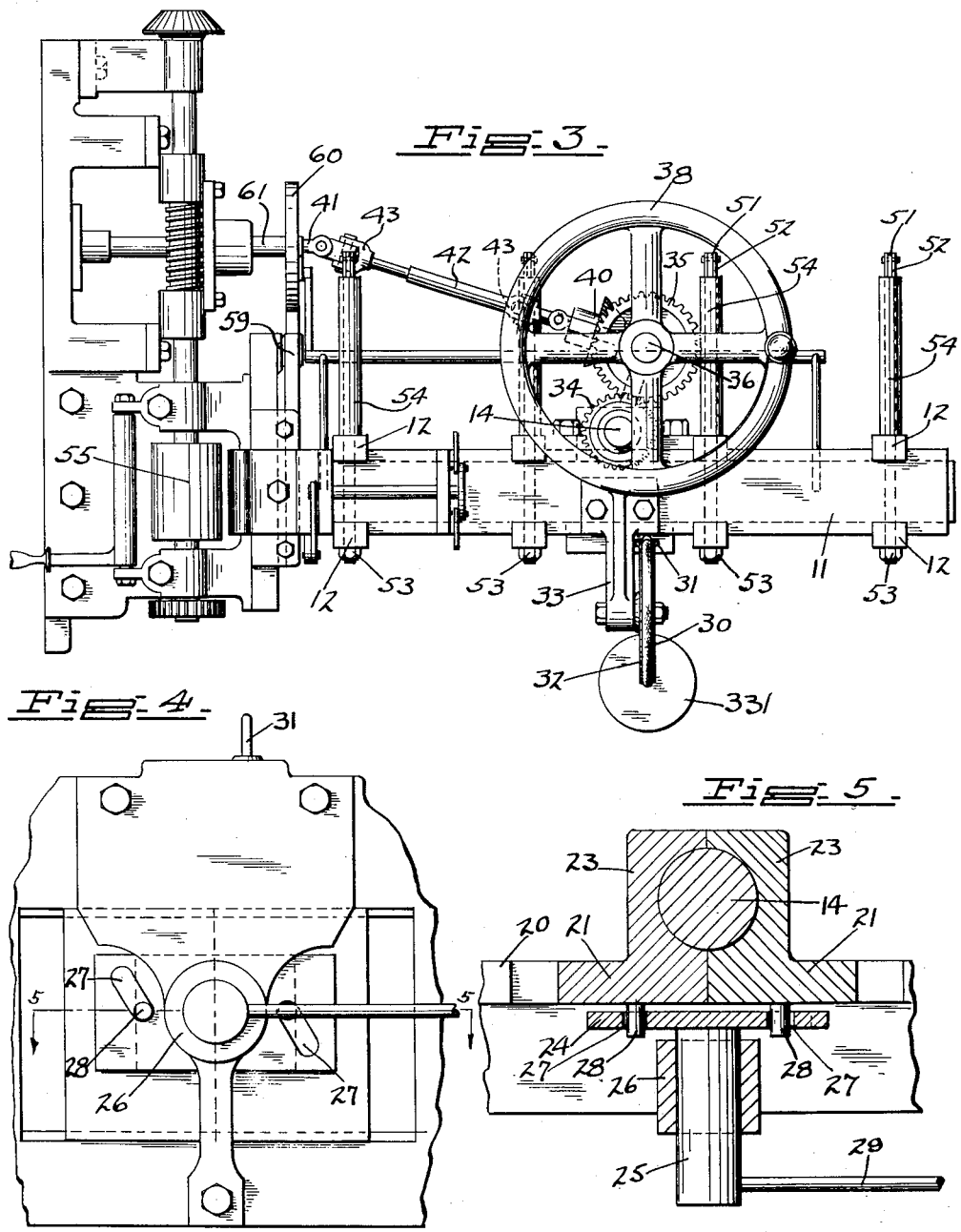

Patented June 11, 1929.

1,717,039

UNITED STATES PATENT OFFICE.

JOHN KARMAZIN, OF DETROIT, MICHIGAN.

RADIATOR-ASSEMBLING MACHINE.

Application filed June 2, 1926. Serial No. 113,143.

This invention relates to improvements in assembling or stacking machines used in manufacturing radiators for automobile engines and particularly to assembling machines of the type described in my co-pending application, Serial No. 716,943, filed May 31, 1924, now Patent 1,591,322, issued July 6, 1926.

In said application, I have described, a machine adapted to receive radiator elements formed from a flat strip of sheet material and having integral tubular projections thereon and to arrange a predetermined number of such elements in a stack or pile and thereafter compact said stack into a radiator. The elements were compacted manually by turning a hand wheel attached to a screw which was threaded through the element supporting carriage and after the radiator was compacted and removed, it was necessary to raise the carriage by turning the screw in order to place it in the proper position to receive the first element of another radiator.

It is one of the objects of the present invention to provide means by which power may be applied to the carriage to raise the same and compact the elements stacked thereon.

Another object of the invention is to provide means to release the carriage from the screw so that the same may be raised or lowered much more quickly than by the use of the screw and hand wheel.

Another object of the invention is to provide means to loosen the upper part of the frame of the machine when the elements are being fed into the machine to allow freer passage of the elements therein, and to rigidly tighten that part of the machine when it is desired to compact the elements into a radiator.

Another object of the invention is to counter-balance the carriage so that the same may be easily raised or lowered when the screw is disconnected therefrom.

These and other objects of the invention will be disclosed as the description thereof proceeds.

In the drawings in which one embodiment of the invention has been illustrated:

Figure 1 is a side elevational view of a stacking machine embodying my invention;

Figure 2 is an end elevational view of the machine shown in Figure 1;

Figure 3 is a plan view of the machine shown in Figure 1 with a portion of the element forming machine attached thereto;

Figure 4 is an enlarged front elevational view of the clutch mechanism used to connect the screw to the carriage; and Figure 5 is a sectional plan view of the clutch taken on the line 5—5 of Figure 4.

Referring more specifically to the drawings, the assembling machine consists of a frame comprising a base 10, and an upper portion 11 connected on each side by uprights 12 which are bolted to the base and top portion. A carriage 13 is mounted between the uprights 12 of the frame and is supported by means of a screw 14 which rests in a suitable bearing 15 integral with the base 10, and a bearing 16 attached to the top portion of the frame. Both these bearings are so mounted that the screw rotates in a vertical position at one side and substantially central of the carriage 13. The carriage 13 has a flat top 17 adapted to receive a radiator forming element and of substantially the same length as the element. The bottom 18 of the carriage may be somewhat shorter than the top and may be connected therewith by a web 19. The web 19 has an extended portion 20 wider than the top of the carriage and adapted to fit slidably between the two central uprights 12 so as to guide the carriage as it is raised and lowered between the uprights. A pair of plates 21 are slidably mounted in an opening 22 which extends through the web 20 and a portion 23 of each plate 21 extends outwardly and around the screw 14 and is threaded to fit the screw so that the portions 23 of the plates form a split nut which may engage with the screw 14 or disengage the screw when the plates are drawn apart. In order to draw the plates apart, a cam plate 24 is rotatably mounted at the back of and adjacent to the plates 21 on a shaft 25 supported in a bearing 26 attached to the top 17 and bottom 18 of the carriage 13. The plate 24 is provided with inclined slots 27 which are substantially parallel and which are adapted to cooperate with the pins 28 attached to the plates 21. A lever 29 is attached to the shaft 25 to permit rotation of the shaft 25 and plate 24. The slots 27 are preferably arranged with relation to the lever 29 so that when the lever is horizontal the pins 28 are in their closest position to the center of the plate 24 and the extended portions 23 of the plates 21 are closed about the screw 14, thus engaging the threads on the screw. The weight of the lever holds the plates 21 in screw engaging position. Upon raising the lever, however, the plate 24 is turned in a counter clockwise direction, thus moving the pins 28 away from the center of the plate 24 as they must necessarily travel in the slots 27 and hence the plates 21 are moved out of screw engaging position and the carriage is free to move up or down in the frame.

To prevent the carriage from falling down when the screw engaging mechanism is released a cable 30 is attached to a suitable ring 31 on the carriage 13 and is passed up over a pulley 32 mounted on a bracket 33 attached to the top 11 of the frame and has a counter weight 331 attached to the other end thereof. By this means the carriage is substantially balanced and may be easily raised or lowered by hand when the screw engaging mechanism is released.

In the operation of the stacking machine, each radiator element is received on the carriage and the carriage is caused to move downwardly by the turning of the screw 14. A gear 34 is attached to the top of the screw 14 and meshes with a gear 35 attached to an auxiliary shaft 36 mounted in a bracket 37 attached to the top 11 of the frame. A hand wheel 38 may be attached to the auxiliary shaft 36, if desired, so that the carriage may be raised or lowered short distances by turning the hand wheel. A bevel gear 39 attached to the bottom of the auxiliary shaft 36 meshes with a gear 40 which receives its motion from a shaft 41 driven by the element forming machine such motion being transmitted by the short shaft 42 and universal joints 43 as is described in more detail in my copending application above referred to.

The downward movement of the carriage is arrested when sufficient elements are stacked thereon by the rod 44 striking a clutch lever (not shown) which stops the element forming machine so that the elements on the stacking machine may be compacted into a radiator.

An air cylinder 45 may be mounted on the base 10 of the frame directly under the carriage 13. A piston 46 is normally held down by a spring 47 and is attached to the bottom of a piston rod 48 having a suitable plunger 49 at the top thereof. When the required number of elements have been stacked on the table 13 and the element forming machine stopped, air under pressure is admitted to the compression cylinder 45 by the three way valve 50, the piston 46 is forced up bringing the platform 49 against the carriage 13 and further raising of the piston raises the carriage and compacts the elements stacked thereon into a radiator core by pressing them between the carriage 13 and the top 11 of the frame.

I have found that in order to permit the radiator elements to pass between the uprights 12 from the forming machine to the stacking machine, it is very desirable to have a clearance at each side of the element while to properly compact the elements it is desirable to have the uprights 12 fit snugly against the elements. To provide this clearance when elements are being fed into the machine and to tighten the upper portion of the machine for compacting the elements, I have provided cam levers 51 which are pivotally mounted in bifurcated ends of the bolts 52 which pass through the uprights 12 and top frame 11 and are secured on the opposite side of the machine by nuts 53. Sleeves 54 through which the bolts 52 pass bear against the uprights 12 at one end and the cam surface of the levers 51 at the other. When the levers are pushed down in the position shown in Figure 2 the bolts 52 are drawn through the sleeves so that the upper portion of the frame is held tightly together between the nuts 53 and the sleeves 54. By raising the cam levers 51 the bolts 52 are quickly loosened and the uprights 12 spring apart enough to permit clearance for the incoming elements.

The operation of the machine is as follows:

Assuming the carriage to be at the top of its travel and the upper part of the frame loosened ready to receive an element, the element forming machine (not shown) is set in motion. As the element forming strip $a$ is fed between the rollers 55 and 56 the end is introduced into the stacking machine and is received between the fingers 57 and the leaf spring 58. When the strip has advanced to the desired length, it is cut off by the cutter 62 which is actuated by the arm 59 contacting with the cam 60 driven by the shaft 61. The fingers 57 then separate allowing the element thus cut off to fall upon the carriage 13. At the same time the screw 14 is rotated by the gears 34, 35, 39 and 40 and the auxiliary shaft 42 driven by the shaft 61 to lower the carriage sufficiently to receive another element and this operation is repeated until a predetermined number of elements are stacked upon the carriage. At this time the arm 44 contacts with and actuates a clutch lever (not shown) and automatically stops the element forming machine hence the lowering of the carriage 13 of the stacking machine. This much of the operation of the machine has been described in detail in my copending application above referred to.

The operator now swings the cam levers 51 into their lower and locked position thereby tightening the upper part of the frame. He then releases the screw engaging plates 23 by lifting the lever 29, and opens the valve 50 admitting air into the compression cylinder 45. The piston 46 is thereby forced up and lifts the carriage compacting the elements thereon, against the top of the frame. The valve 50 is then shut off allowing the air in the cylinder to escape through the outlet 50ª in the valve and the carriage to lower. The compacted radiator is removed after first loosening the upper frame of the machine by releasing the cam levers 51 whereupon the carriage being balanced by the counter weight 331 may be quickly and easily lifted to its uppermost element receiving position by hands, thereby saving the time formerly required to elevate the carriage by rotation of the screw 14. The lever 29 is then pushed downwardly thus turning the plate 24 in a clockwise direction and bringing the pins 28 and the plates 23 toward each other into screw engaging position after which the machine is ready to receive and stack the elements for another radiator core.

From the foregoing, it will be evident that I have provided a machine for making radiator cores out of radiator elements which has eliminated all the labor and time required to raise and lower the carriage by means of a hand wheel to compress the core or return the carriage to its upper position and which will cause the stack of elements to be compacted by merely opening a valve.

Various modifications of the invention other than those shown and described in this application may be resorted to without departing from the spirit of the invention and I do not therefore desire to limit my invention to any specific embodiment of the same but to interpret it broadly within the scope of the appended claims.

What I claim as my invention is:

1. In a radiator assembling machine a radiator element receiving carriage, means for lowering said carriage as said elements are received thereon and power means to raise said carriage to compact said elements into a radiator.

2. In a radiator assembling machine, a frame, a radiator element receiving carriage slidably mounted within said frame, means to lower said carriage as said elements are received thereon, means to tighten the upper portion of said frame snugly about said radiator elements and power means to raise said carriage to compact said elements into a radiator.

3. In a radiator assembling machine, a radiator element receiving carriage, means to raise said carriage to compact radiator elements placed thereon, comprising a cylinder, a piston, means attached to said piston and cooperating with said carriage and means to admit a fluid under pressure to said cylinder.

4. In a radiator assembling machine, a frame, a screw rotatably mounted in said frame, means for rotating said screw, a carriage slidably mounted in said frame, means attached to said carriage for releasably engaging said screw and means exclusive of said screw for raising said carriage to compact radiator elements placed thereon.

5. In a radiator assembling machine, a frame, a radiator element receiving carriage slidable within said frame, means for counter-balancing said carriage, means for automatically lowering said carriage as radiator elements are received thereon, means for stopping said lowering means for releasing said carriage from said lowering means, means not connected with said lowering means to raise said carriage to compact the radiator elements thereon.

6. In a radiator assembling machine, a frame, a radiator element receiving carriage slidable within said frame, a counter-balance for said carriage comprising a weight, a pulley rotatably mounted on said frame, a cable connecting said carriage with said weight and passing over said pulley, means to lower said carriage as radiator elements are received thereon, means to release the carriage from said lowering means and means separate from said lowering means to raise said carriage to compact said elements thereon into a radiator.

7. In a radiator assembling machine, a frame, a radiator element receiving carriage slidably mounted in said frame, a counter-balance for said carriage, means to automatically lower said carriage as the radiator elements are received thereon, means to stop said lowering means when a predetermined number of elements have been received on said carriage, means to release said carriage from said lowering means and means to raise said carriage to compress the elements contained thereon, said means comprising a cylinder and a piston within said cylinder and means to admit a fluid under pressure into said cylinder.

8. In a radiator assembling machine, a frame, a radiator element receiving carriage slidably mounted within said frame, means to counter-balance said carriage, means to lower said carriage as the radiator elements are received thereon, means to stop said lowering means when a predetermined number of elements have been received thereon, means to release said carriage from said lowering means, means to tighten the upper portion of said frame snugly about said radiator elements on said carriage, and means separate from said lowering means to raise said carriage and compact said elements into a radiator.

9. In a radiator assembling machine a frame, means to loosen said frame to provide clearance for incoming radiator elements and to tighten said frame when said elements are being compacted to form a radiator.

10. In a radiator assembling machine a frame, means to loosen said frame, to provide clearance for incoming radiator elements and to tighten said frame to provide snugly fitting sides for compacting said elements, comprising means engaging one side of said frame, means engaging the other side of said frame, cam means pivotally attached to one of said means and associated with the other of said means to draw said means together when said cam means is turned in one direction and to allow said means to move apart when said cam means is turned in the opposite direction.

11. In a radiator assembling machine, a frame, comprising a top and a base and a plurality of uprights connecting said top and base, a bolt passing through each pair of oppositely disposed uprights, a nut on one end of said bolt, a cam lever pivotally connected to the other end of said bolt, a sleeve on said bolt adjacent said cam lever and adapted to be drawn toward said nut when said cam lever is turned about its pivot in one direction and permitted to move away from said nut when said cam lever is turned about its pivot in the other direction.

12. In a radiator assembling machine, a frame, a radiator element receiving carriage slidable within said frame, means to lower said carriage as the radiator elements are received thereon, separate means to raise said carriage to compact said elements against the top of said frame and means to loosen said frame to provide clearance for said incoming radiator elements and to tighten said frame to snugly fit said radiator elements for compacting said elements.

13. In a radiator assembling machine, a carriage for supporting the radiator elements received by said machine, a rotatable screw for lowering said carriage and means attached to said carriage for releasably engaging said screw.

14. In a radiator assembling machine, a carraige for supporting the radiator elements received by said machine, a rotatable screw for lowering said carriage and means attached to said carriage for releasably engaging said screw comprising a split nut and means to draw the parts of the split nut closely about said screw or separate said parts thereby moving the same out of engagement with said screw.

15. In a radiator assembling machine, a carriage for supporting radiator elements received by said machine, a rotatable screw for lowering said carriage, means attached to said carriage for releasably engaging said screw comprising a split nut the parts of said nut being slidably mounted in said carriage, a pin extending from each part of said split nut, a cam plate rotatably mounted adjacent said split nut and having outwardly extending cams adapted to cooperate with said pins and means to rotate said plate to separate the parts of said nut.

16. In a radiator assembling machine, a carriage, a rotatable screw releasably cooperating with said carriage to lower said carriage and separate power means to raise said carriage comprising a cylinder, a piston in said cylinder, a piston rod adapted to cooperate with said carriage and means to admit fluid under pressure to said cylinder.

17. In a radiator assembling machine means to feed a strip of element forming material into said machine, means to sever said strip into elements of a predetermined length, means to stack a plurality of said elements in superposed relation and power means to compress said superposed elements into a radiator.

18. In a radiator assembling machine means to feed a strip of element forming material into said machine, means to sever said strip into elements of a predetermined length means to stack a plurality of said elements in superposed relation and means to compress said superposed elements into a radiator comprising a cylinder, a piston in said cylinder and means to admit a fluid under pressure into said cylinder.

19. In a radiator assembling machine, means to feed a strip of element forming material into said machine, means to sever said strip into elements of a predetermined length, a carriage to receive said elements, means to counter-balance said carriage, means to lower said carriage as said elements are received thereon, means to stop said machine when a predetermined number of elements have been received on said carriage means to release said carriage from said carriage lowering means, means separate from said lowering means to raise said carriage to compact said elements into a radiator and means to guide said elements when said elements are being compacted.

20. In an assembling machine for radiator elements, a frame, a receiving table, means for lowering said table as radiator elements are placed thereon, said means comprising a screw and a screw engaging device associated with said table, and means for releasing said screw engaging device from said screw to permit manual return of the table to its upper position.

21. In a radiator assembling machine of the class described, a frame adapted to receive a stack of sheet metal radiator forming elements, a movable table, means for lowering said table step by step to receive additional elements and means for applying power to and displacing said table to compact the elements in said frame into a radiator.

In testimony whereof I have affixed my signature to this specification.

JOHN KARMAZIN.